US012794404B2

(12) United States Patent
Von Deylen et al.

(10) Patent No.: US 12,794,404 B2
(45) Date of Patent: Nov. 10, 2026

(54) VERTICAL SOLAR REFLECTOR

(71) Applicant: APA SOLAR, LLC, Ridgeville Corners, OH (US)

(72) Inventors: Josh Von Deylen, Bryan, OH (US); Richard Alan Roth, Archbold, OH (US)

(73) Assignee: APA SOLAR, LLC, Ridgeville Corners, OH (US)

( * ) Notice: Subject to any disclaimer, the term of this patent is extended or adjusted under 35 U.S.C. 154(b) by 0 days.

(21) Appl. No.: 19/238,772

(22) Filed: Jun. 16, 2025

(65) Prior Publication Data

US 2025/0385642 A1 Dec. 18, 2025

Related U.S. Application Data

(60) Provisional application No. 63/659,967, filed on Jun. 14, 2024.

(51) Int. Cl.
*H02S 30/10* (2014.01)
*H02S 40/22* (2014.01)

(52) U.S. Cl.
CPC .............. *H02S 30/10* (2014.12); *H02S 40/22* (2014.12)

(58) Field of Classification Search
CPC .......... H02S 20/00; H02S 20/10; H02S 20/30; H02S 20/32; H02S 30/10; H02S 40/22
See application file for complete search history.

(56) References Cited

U.S. PATENT DOCUMENTS 6,971,756 B2 * 12/2005 Vasylyev ................ F24S 23/74 359/853
2010/0229852 A1 * 9/2010 Buckley .................. F24S 10/45 126/696

FOREIGN PATENT DOCUMENTS

WO WO-9942765 A1 * 8/1999 ............. F24S 10/45

OTHER PUBLICATIONS

Machine translation of WO-9942765-A1, Ven Livien Domien. (Year: 1999).*

(Continued)

*Primary Examiner* — Mayla Gonzalez Ramos
(74) *Attorney, Agent, or Firm* — Jacob M. Ward; Ward Law Office LLC

(57) ABSTRACT

A solar panel system includes a frame having vertical members, horizontal supports, and vertical supports arranged to hold vertical solar modules perpendicular to the ground. The system incorporates a reflector system with mounting assemblies positioned on opposite sides of the vertical solar modules. Each mounting assembly includes angled mounting arms supporting reflector panels configured to redirect sunlight onto both faces of the bifacial solar modules. The reflector panels include modular portions with C-shaped configurations having top reflective surfaces and mounting walls positioned below the reflective surfaces, enabling individual portion replacement while maintaining an uninterrupted reflective surface. Mounting brackets secure the mounting arms to the vertical members through overlapping arrangements for tubular members or abutting configurations for I-beam members. The system includes perimeter gaps around the solar modules for air circulation while optimizing energy capture throughout the day, particularly addressing power output reduction during high noon.

20 Claims, 10 Drawing Sheets

(56) References Cited

OTHER PUBLICATIONS

Trina Solar, "Vertex S+ Backsheet Monocrystalline Module", Product: TSM-NE09RC.05, Fremont, California, webapge, https://www.trinasolar.com/us/product/VERTEXS-NE09RC.05.

Heltsley, Kathryn, "Can I Mount Solar Panels Vertically?—ItekEnergy", webpage, https://www.itekenergy.com/solar-panels/can-i-mount-solar-panels-vertically.

* cited by examiner

VERTICAL SOLAR REFLECTOR

CROSS-REFERENCE TO RELATED APPLICATIONS

This application claims the benefit of U.S. Provisional Application No. 63/659,967, filed on Jun. 14, 2024. The entire disclosure of the above application is incorporated herein by reference.

FIELD

The present technology relates to solar energy collection systems and, more particularly, to enhancements in the structural components used to increase the efficiency of solar panels.

INTRODUCTION

This section provides background information related to the present disclosure which is not necessarily prior art.

Solar power technology encompasses diverse approaches to capturing and converting solar radiation into usable energy. The efficiency of solar energy collection can be dependent on the orientation and positioning of solar panels. Certain solar panels are installed with a fixed orientation, typically angled to capture maximum sunlight. This setup, while effective under certain conditions, does not always align with the varying angles of sunlight throughout the day or across different seasons.

One approach to improve solar capture efficiency is the use of a tracking system that adjusts the angle of the solar panels to follow the trajectory of the sun. While a tracking system can enhance energy capture, the system can also introduce complexities, including mechanical parts that require regular maintenance, increased costs, and potential points of failure. Moreover, certain tracking systems are generally not suitable for all types of installations, particularly in urban or space-constrained environments.

Vertical solar panels can be used as an alternative, and can be especially useful in urban settings or on surfaces where traditional panel installations are not feasible. Vertical solar panels can be installed on the sides of buildings or integrated into structures like sound barriers along highways. However, vertical solar panel installations face inherent challenges due to their orientation. Vertical panels can receive less direct sunlight compared to angled panels, particularly during peak sun hours, which can significantly reduce their efficiency.

The fixed nature of vertical solar installations further means they cannot adapt to changes in the position of the sun, which can lead to suboptimal energy production. This can be particularly problematic during times when sunlight is available at a low angle, such as during early morning or late afternoon, further exacerbating the efficiency issues. The limitations of certain vertical solar installations become more pronounced in applications where space optimization is important, such as in agricultural settings or dense urban environments.

There is a continuing need for improvements in solar panel installations that can maximize energy capture without the complexities and costs associated with tracking systems. Desirably, such solutions would enhance the functionality of vertically installed solar panels, allowing them to capture more sunlight throughout the day and across different seasons, thereby addressing the inefficiencies associated with current vertical solar panel technologies.

SUMMARY

In concordance with the instant disclosure, improvements in solar panel installations that can maximize energy capture have surprisingly been discovered. The present technology includes articles of manufacture, systems, and processes that relate to the optimization of solar energy capture through innovative structural and reflective enhancements configured for vertical solar panel installations.

In certain embodiments, a solar panel system can include a frame having a first vertical member, a second vertical member, a top horizontal support extending between the first vertical member and second vertical member, and a cross horizontal support extending between the first vertical member and second vertical member. A vertical solar module can be disposed between the first vertical member and second vertical member. A reflector system can include a mounting assembly having a first mounting arm and a second mounting arm, each disposed at an angle relative to the vertical members, and a reflector panel can be disposed on each of the first mounting arm and the second mounting arm.

In certain embodiments, a solar panel system can include a frame having vertical members, horizontal supports, and vertical supports arranged to support multiple vertical solar modules. Each vertical solar module can comprise a bifacial solar panel having solar cells on both sides. A plurality of mounting brackets can secure the vertical solar modules to the frame while maintaining perimeter gaps around the modules. A reflector system can include first and second mounting assemblies, each having mounting arms disposed at angles relative to the vertical members and mounting brackets securing the arms to the vertical members. Each mounting assembly can support a plurality of reflector portions having top reflective surfaces, side walls, and mounting walls, with the mounting assemblies positioned on opposite sides of the vertical solar modules to direct sunlight onto both faces of the modules.

In certain embodiments, a method of installing a solar panel system can include providing a frame having vertical members and horizontal supports, installing vertical supports between the horizontal supports using mounting brackets, installing vertical solar modules between the vertical members and vertical supports with mounting brackets configured to create perimeter gaps, selecting an angular disposition for mounting arms relative to the vertical members to optimize sunlight redirection, securing mounting brackets to the vertical members, securing the mounting arms to the mounting brackets at the selected angle, and mounting reflector portions to the mounting arms with mounting walls providing attachment points below top reflective surfaces.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
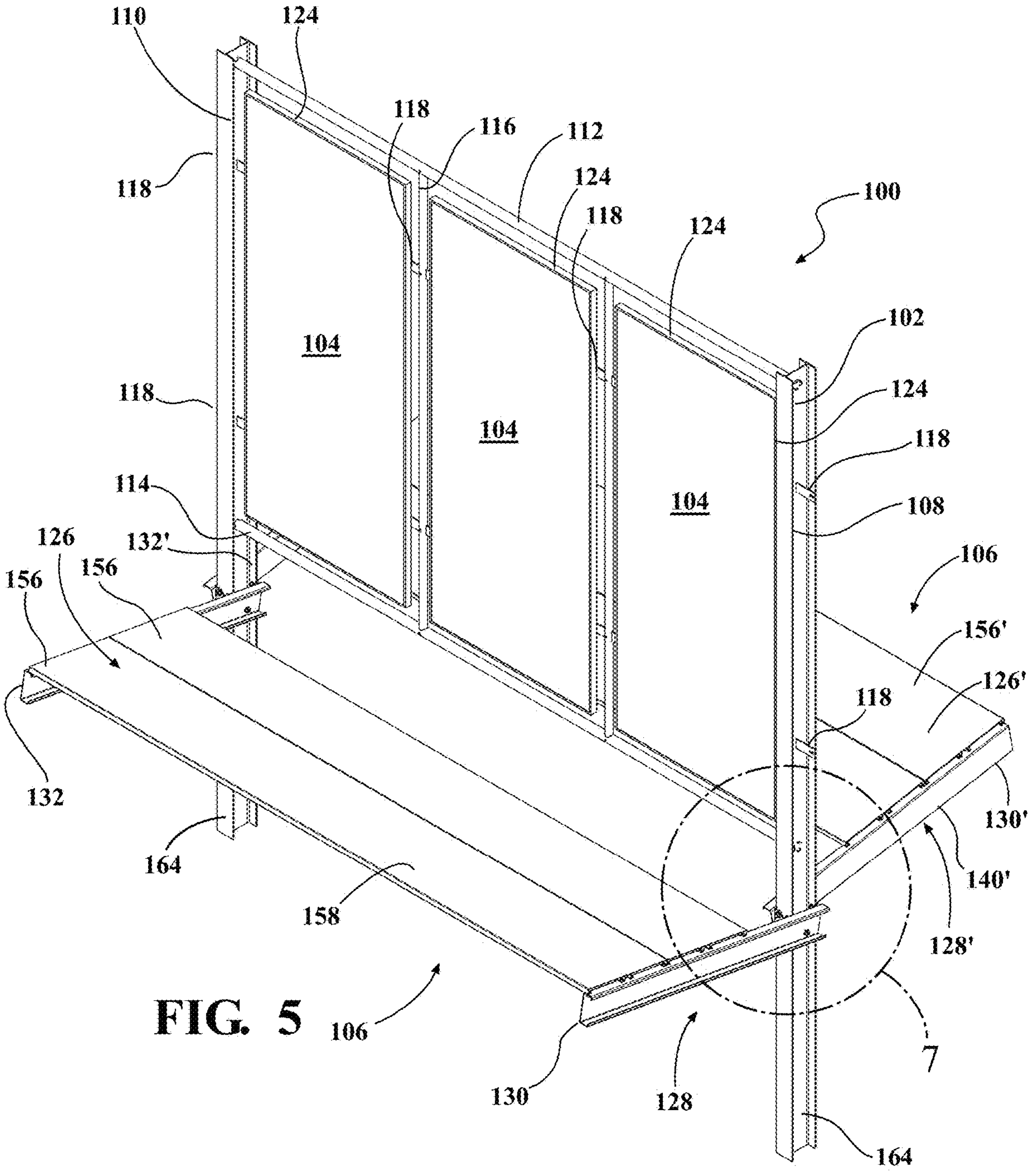

FIG. 5 a top perspective view of a vertical solar panel system, according to another embodiment of the present disclosure.

Figure 6:
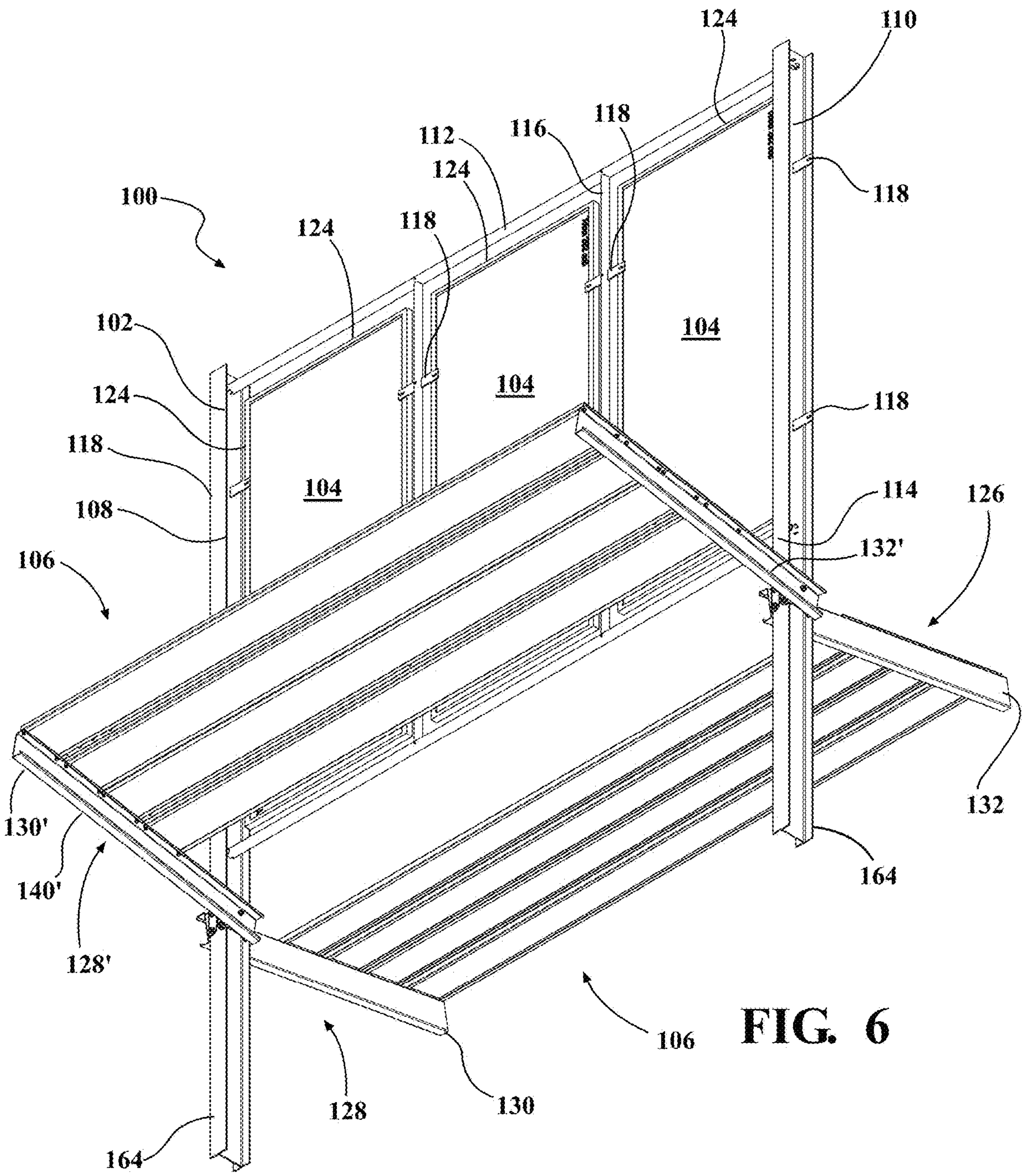

FIG. 6 is a bottom perspective view of the vertical solar panel system of FIG. 5.

Figure 7:
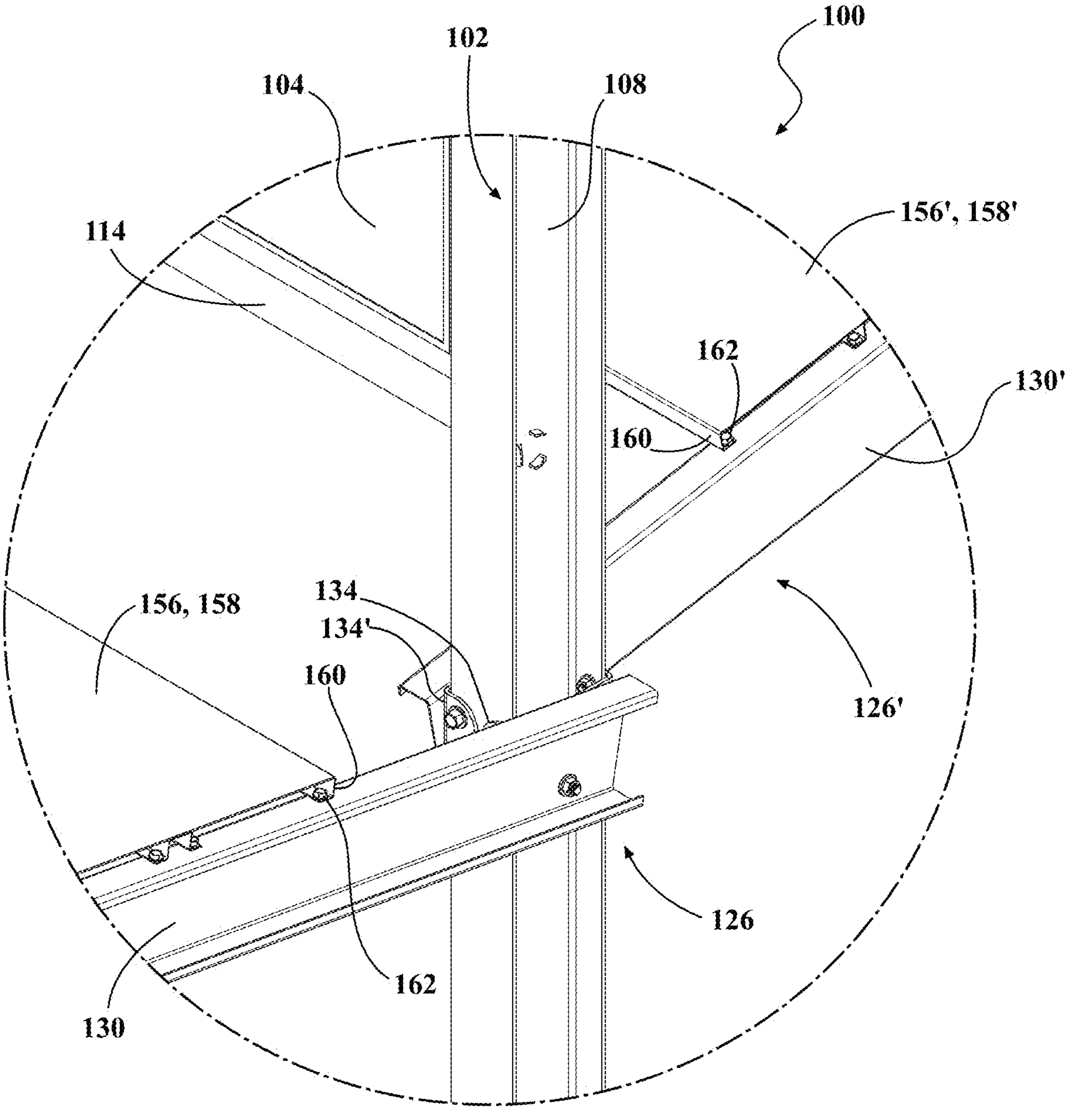

FIG. 7 is an enlarged perspective view of a mounting assembly of the solar panel system taken at callout 7 in FIG. 5.

Figure 8:
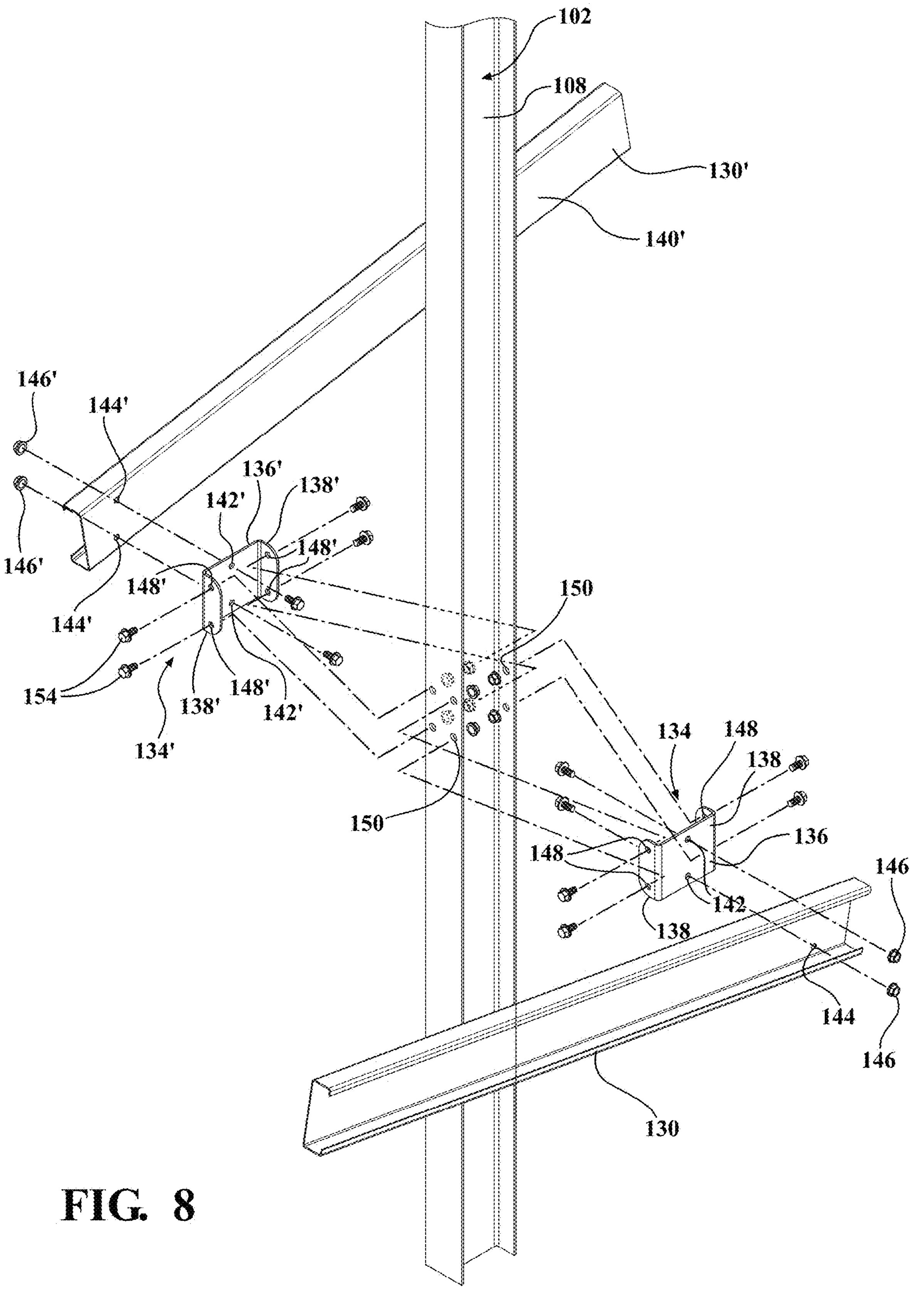

FIG. 8 is an exploded perspective view of a portion of the mounting assembly of FIG. 7.

Figure 9:
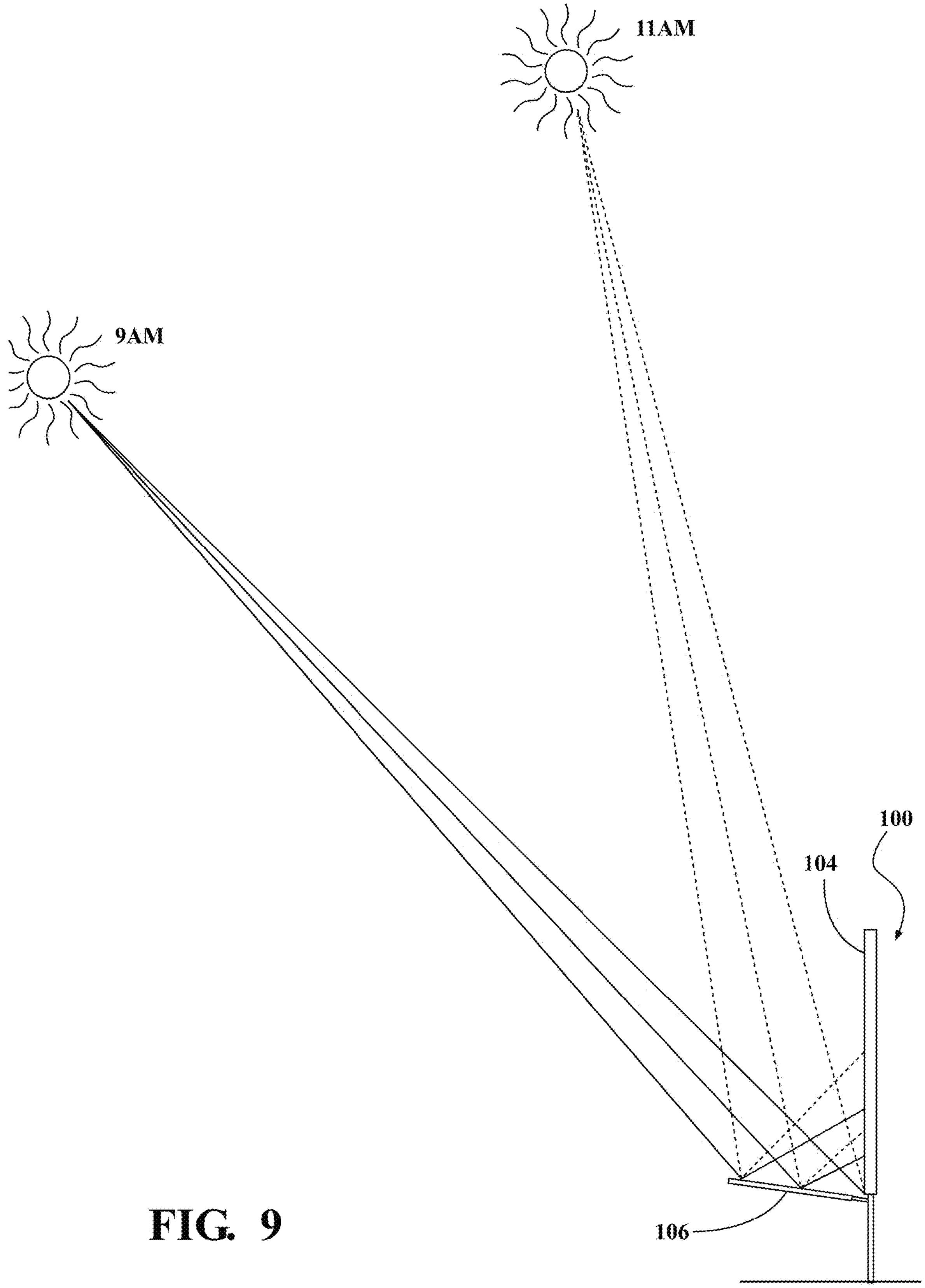

FIG. 9 is a side elevational view of the vertical solar panel system depicting a reflection of light off of a reflector and onto a solar module, according to embodiment of the present disclosure.

Figure 10:
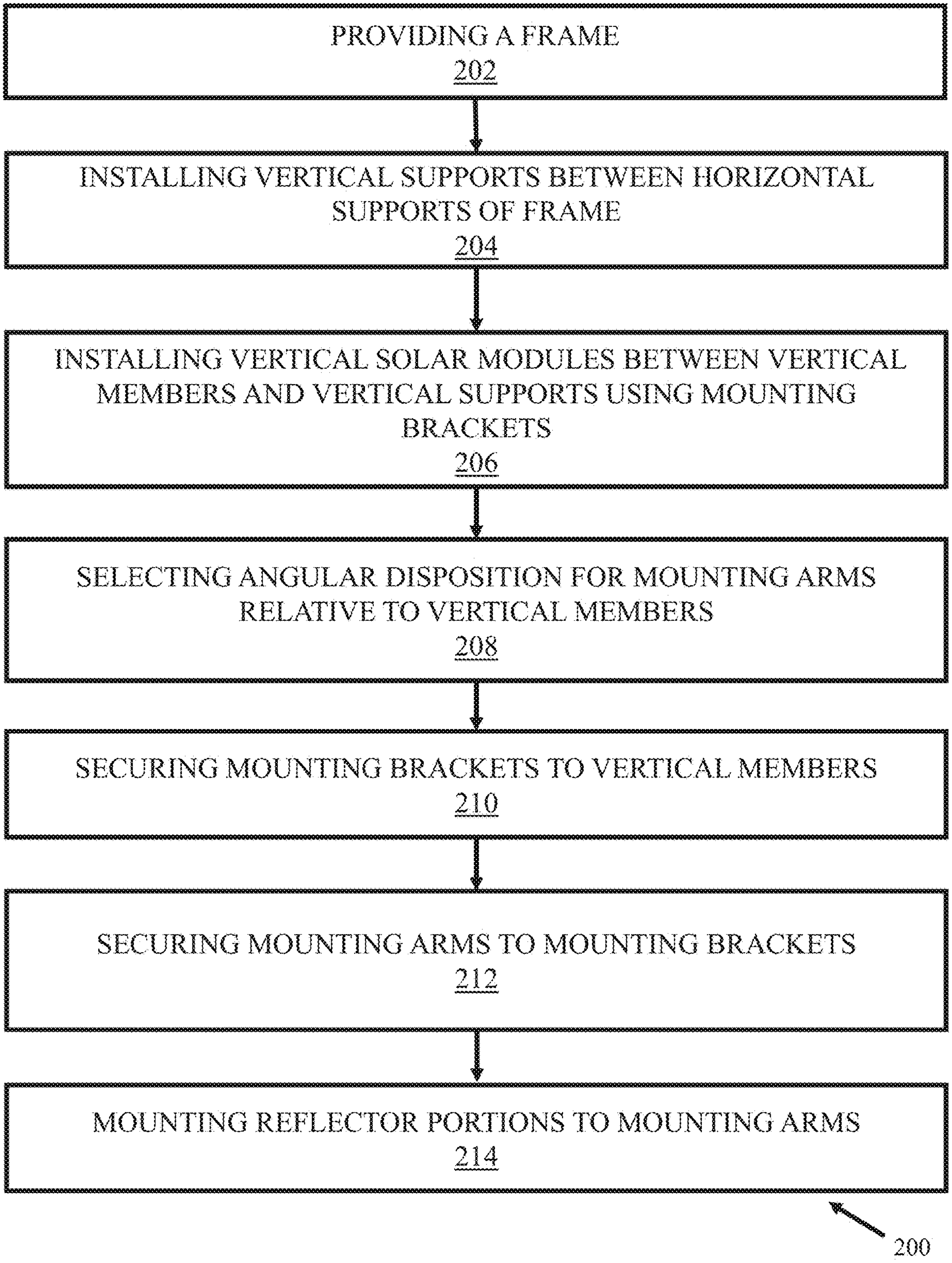

FIG. 10 is a flowchart depicting a method of installing a vertical solar panel system.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-9, aspects of a solar panel system 100 are shown. The solar panel system 100 can be configured to enhance the efficiency and effectiveness of solar energy capture using a vertical solar module and an adjacent reflector system. The solar panel system 100 can be particularly beneficial for applications where land space is limited and where dual functionality, such as agrivoltaics and animal pastures, is desired. The solar panel system 100 can include a frame 102. The frame 102 can serve as a mount for a vertical solar module 104 and a reflector system 106. The frame 102 can support and maintain a vertical orientation of the solar module 104 while providing mounting points for the reflector system 106. Advantageously, the frame 102 can serve as a structural foundation that enables the strategic positioning of both the vertical solar module 104 and the reflector system 106 to optimize solar energy capture throughout the day.

The frame 102 can be defined by a first vertical member 108, a second vertical member 110, a top horizontal support 112, and a cross horizontal support 114. The first vertical member 108 and second vertical member 110 can be disposed in a substantially vertical orientation and can be configured to support the vertical solar module 104 in a perpendicular orientation relative to the ground. The top horizontal support 112 can extend between and connect upper portions of the first vertical member 108 and second vertical member 110. The cross horizontal support 114 can extend between and connect the first vertical member 108 and second vertical member 110 at a position below the top horizontal support 112. The frame 102 can also include one or more vertical supports 116 extending between the top horizontal support 112 and the cross horizontal support 114. The vertical supports 116 can be disposed between the first vertical member 108 and second vertical member 110 to provide additional structural stability to the frame 102 and support for one or more vertical solar modules 104.

Figure 1:
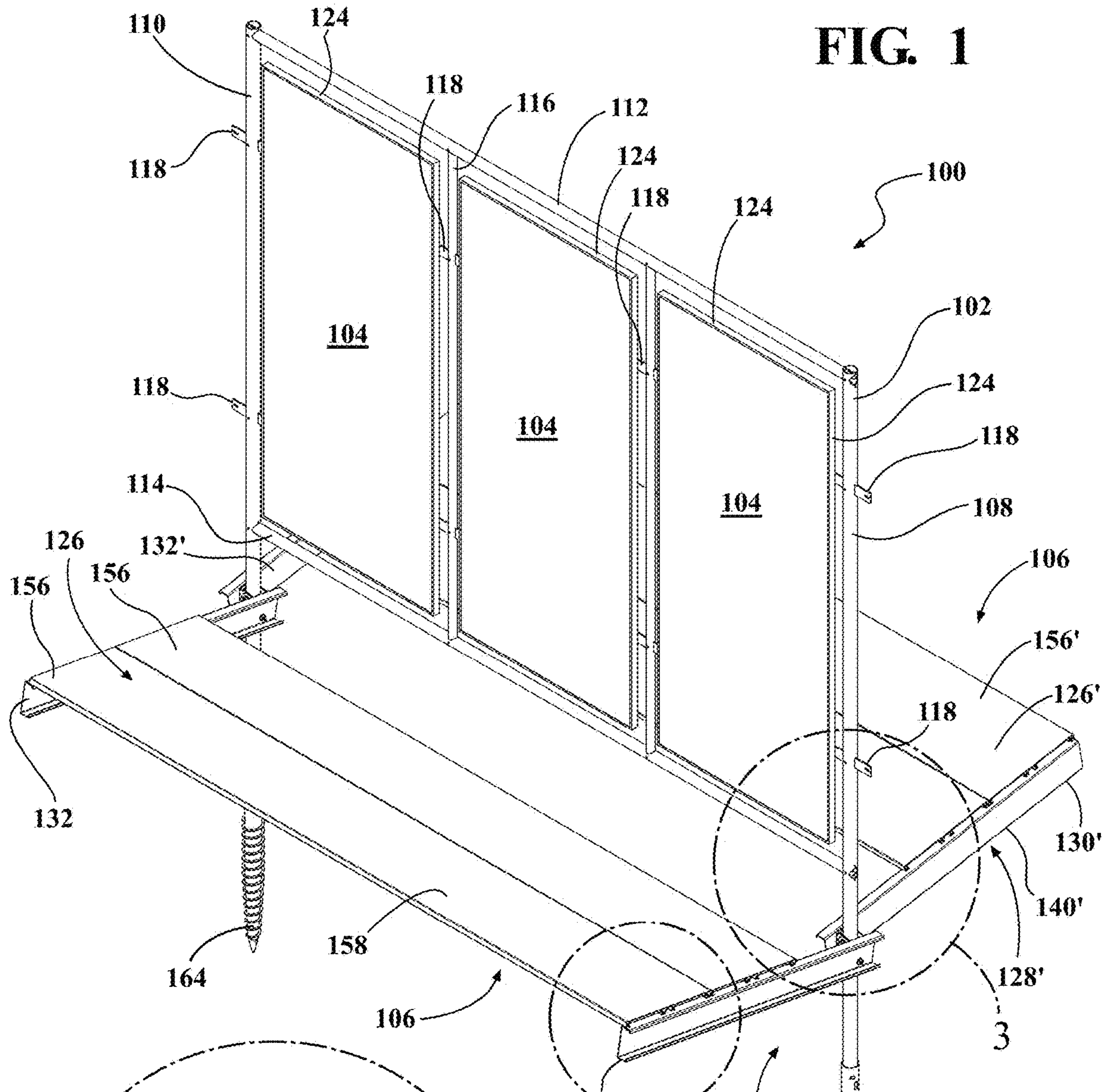
FIG. 1 is a top perspective view of a vertical solar panel system, according to one embodiment of the present disclosure.
Figure 1A:
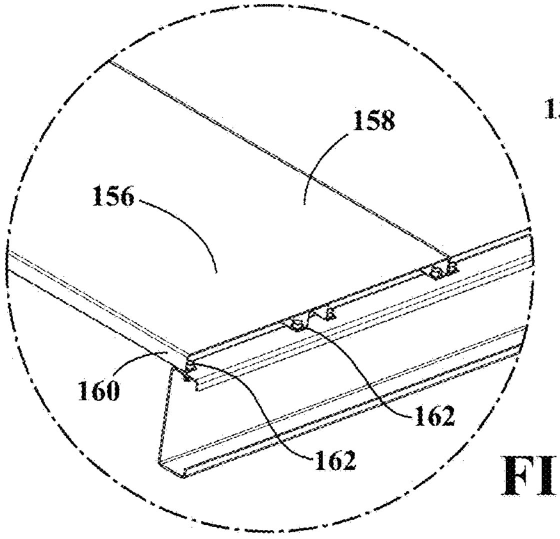
FIG. 1A is an enlarged view of a solar panel portion taken at callout 1A in FIG. 1.
Figure 2:
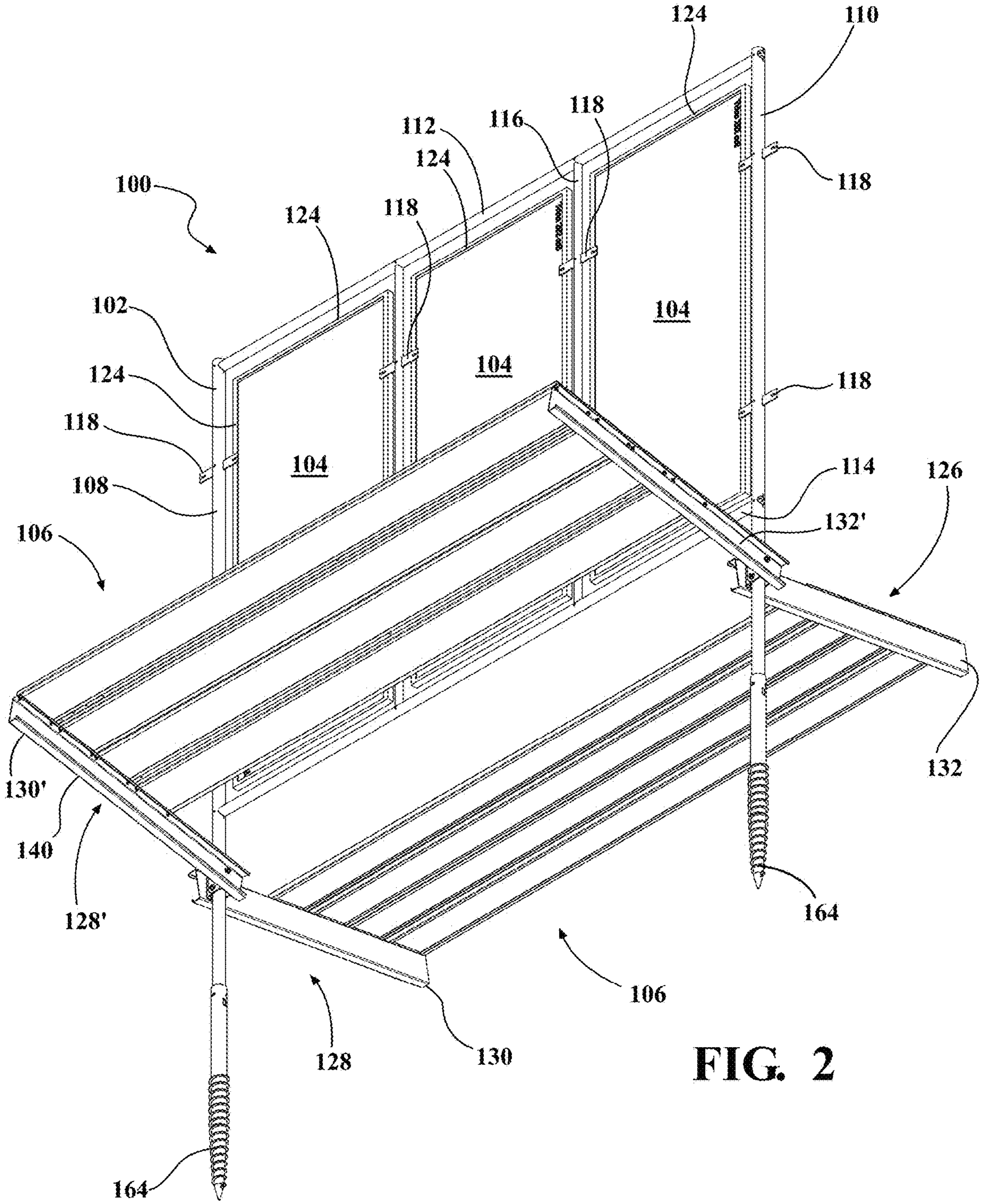
FIG. 2 is a bottom perspective view of the vertical solar panel system of FIG. 1.
Figure 3:
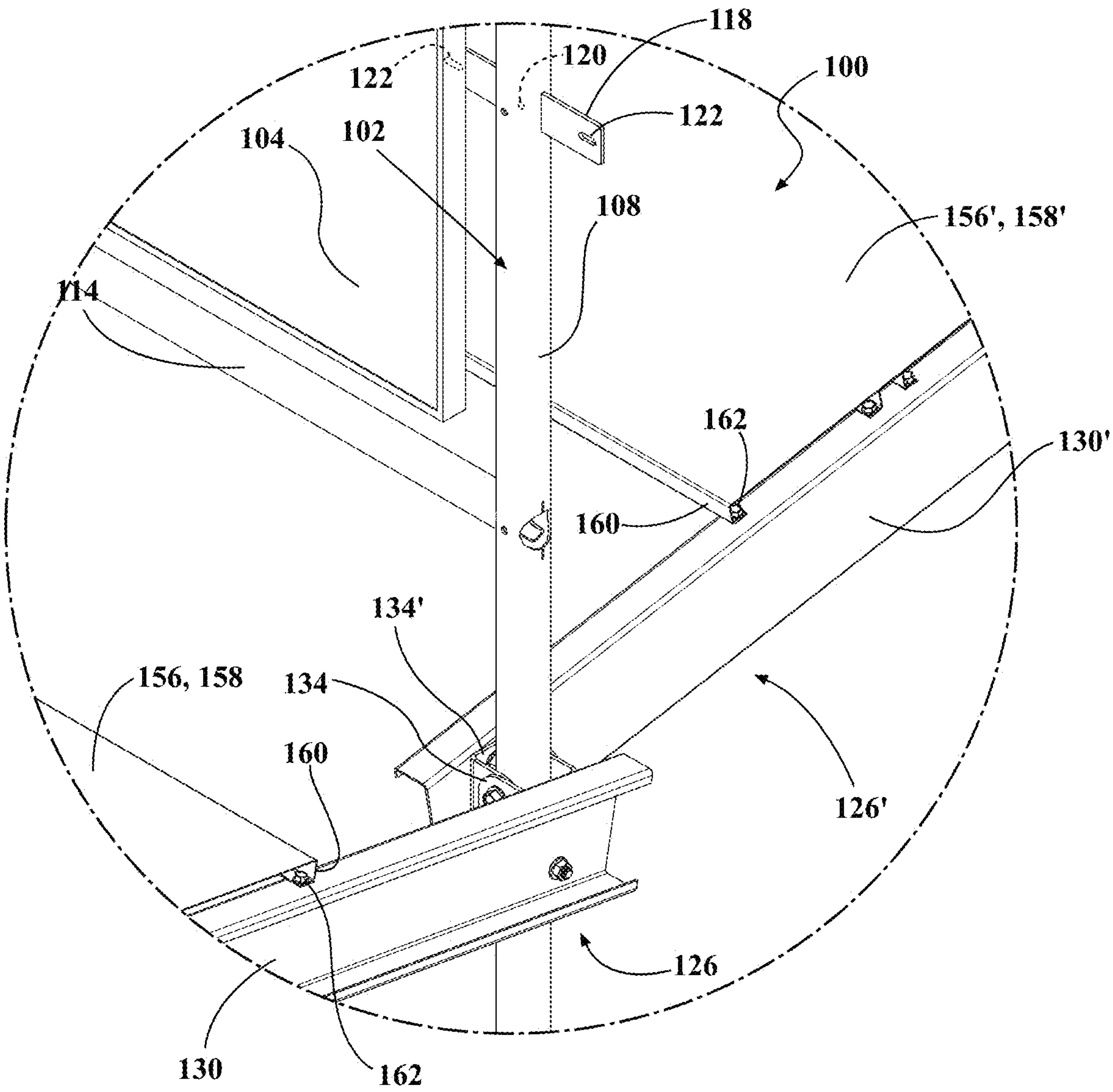
FIG. 3 is an enlarged perspective view of a mounting assembly of the solar panel system taken at callout 3 in FIG. 1.
Figure 4:
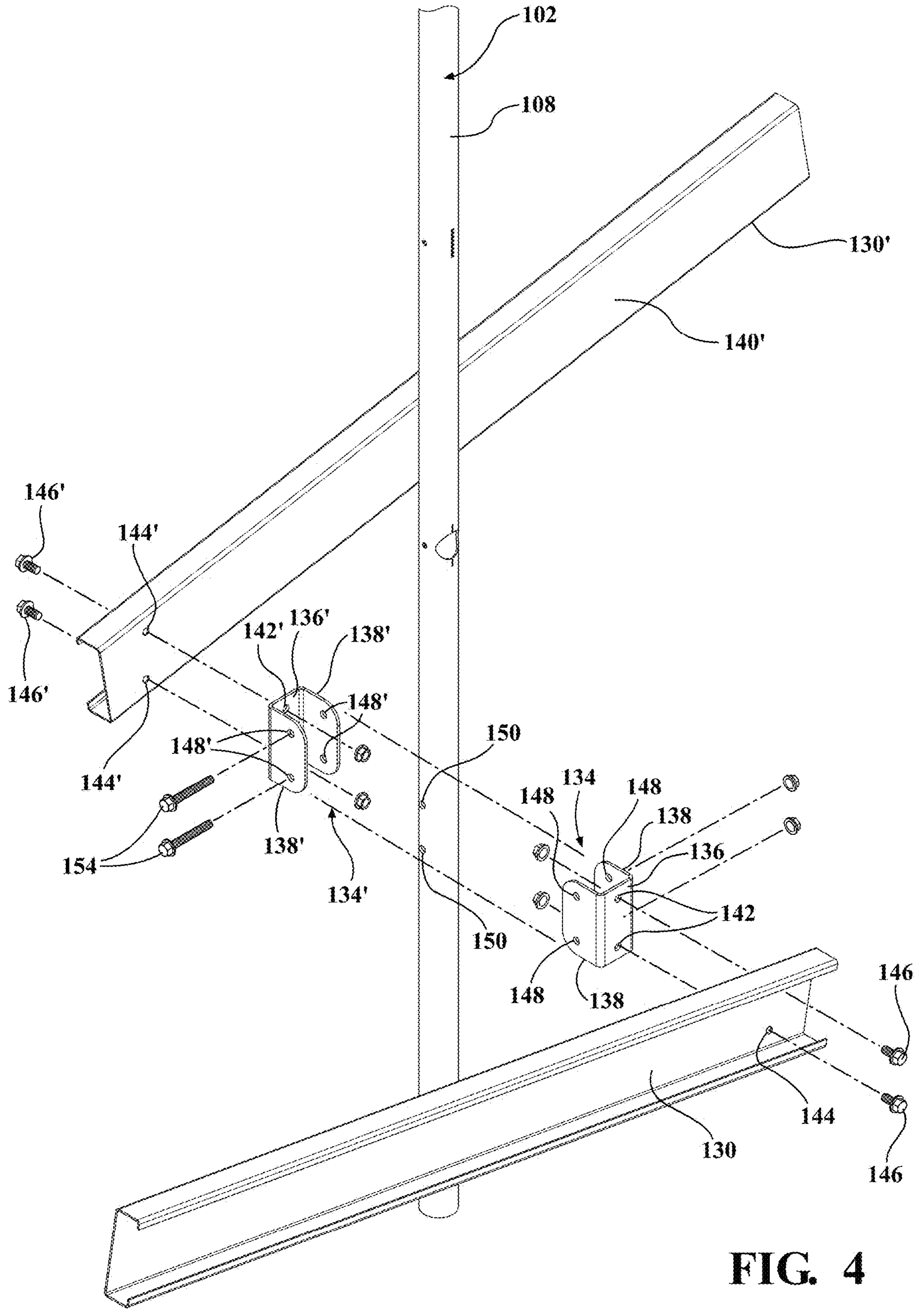
FIG. 4 is an exploded perspective view of a portion of the mounting assembly of FIG. 3.

The first vertical member 108, second vertical member 110, top horizontal support 112, cross horizontal support 114, and vertical supports 116 can each include tubular members, for example, as shown in FIGS. 1-2. In other embodiments, the first vertical member 108 and the second vertical member 110 can include I-beams (for example, as shown in FIGS. 5-6), while the vertical supports 116, top horizontal support 112, and cross horizontal support 114 can include tubular members. It should be appreciated that the shape and configuration of the first vertical member 108, second vertical member 110, top horizontal support 112, cross horizontal support 114, and vertical supports 116 can be selected from various structural profiles suitable for supporting the vertical solar module 104 and reflector system 106. While tubular members and I-beams are described herein, other structural shapes and profiles may be used, such as C-channels, angle iron, or square tubing, as would be understood by those skilled in the art. The selection of appropriate structural shapes can be based on factors including load requirements, environmental conditions, and installation requirements for connecting to ground screws, driven piles, or other foundation systems.

The frame 102 can be fabricated using various connection methods to join the first vertical member 108, second vertical member 110, top horizontal support 112, cross horizontal support 114, and vertical supports 116. The components can be connected via welding to create permanent, rigid joints between the structural members. Alternatively, the components can be connected using mechanical fasteners, such as bolts, nuts, and brackets, which allow for field assembly and potential disassembly if needed. The selection of connection methods can be based on factors including installation requirements, site conditions, and whether permanent or removable connections are desired for the specific application. In embodiments where the frame components include tubular members, the ends can be prepared for welding by appropriate cutting and beveling, or can include pre-fabricated connection points configured to accept mechanical fasteners. When I-beams are used for the first vertical member 108 and second vertical member 110, appropriate connection details can be incorporated to facilitate either welded or bolted connections with the tubular horizontal supports and vertical supports.

The dimensions of the frame 102 can be selected based on the size and configuration of the vertical solar module 104 and reflector system 106. The spacing between the first vertical member 108 and second vertical member 110 can be determined by the width of the solar module 104, while the height of the first vertical member 108 and second vertical member 110 can be selected based on the desired elevation of the installation. The number and spacing of vertical supports 116 between the top horizontal support 112 and cross horizontal support 114 can be determined based on structural requirements, the number of vertical solar modules 104, and the width of the frame 102.

Multiple frames 102 can be linked together in a linear arrangement to form an extended installation. The frames 102 can share common vertical members, where the second vertical member 110 of one frame can serve as the first vertical member 108 of an adjacent frame, thereby optimizing material usage. When linking multiple frames 102, additional vertical supports 116 can be added at the connection points to provide enhanced structural stability. The spacing between linked frames 102 can be adjusted to optimize land use while maintaining adequate clearance for maintenance access and, in agricultural applications, allowing sufficient space for equipment passage and crop growth.

The vertical solar module 104 can be disposed in the frame 102 between the first vertical member 108, second vertical member 110, top horizontal support 112, and cross horizontal support 114. The vertical solar module 104 can be configured to be positioned perpendicular to the ground to optimize solar energy capture. In embodiments with multiple vertical solar modules 104, the vertical supports 116 can be disposed between adjacent vertical solar modules 104 to provide structural support and maintain proper spacing.

The vertical solar module 104 can be bifacial, allowing for solar energy capture from both sides of the vertical solar module 104. The vertical solar module 104 can include a frame disposed around an exterior perimeter of a solar panel. The frame can include an anodized aluminum alloy frame, as a non-limiting example. Each face of the vertical solar module 104 can include a high transmission tempered glass front surface, polyolefin elastomer (POE) and ethylene vinyl acetate (EVA) encapsulant materials, and a black grid transparent backsheet, as non-limiting examples. An example of a commercially available bifacial solar module suitable for use in the vertical solar panel system 100 is the Vertex S+ module from Trina Solar (Fremont, California).

The vertical solar module 104 can be mounted to the frame 102 via on or more mounting brackets 118. The mounting brackets 118 can secure the vertical solar module 104 to the first vertical member 108, second vertical member 110, and vertical supports 116 while maintaining the perpendicular orientation of the vertical solar module 104 relative to the ground. The frame 102 of the vertical solar module 104 can interface with the mounting brackets 118 to allow the vertical solar module 104 to be mounted while maintaining functionality of the solar cells therein. The mounting brackets 118 can include a generally flat bracket having a central aperture 120 and one or more mounting slots 122 disposed on opposing sides of the central aperture 120. The central aperture 120 can be received by the associated vertical member 108, 110 or vertical support 116, allowing the bracket 118 to pass through and be secured via a fastener. The mounting slots 122 on each side of the central aperture can be configured to receive and secure adjacent solar modules 104, enabling a single mounting bracket 118 to support multiple solar modules 104 while maintaining proper spacing between vertical solar modules 104.

The mounting brackets 118 can alternatively be welded directly to the vertical members 108, 110 or vertical supports 116 to provide a permanent connection. Additionally, the mounting brackets 118 can include an arcuate surface disposed between the mounting slots 122 that corresponds to the outer diameter of the tubular vertical members 108, 110 or vertical supports 116, allowing the brackets 118 to be mounted on the exterior while maintaining proper alignment of the solar modules 104 between the vertical members 108, 110.

The mounting brackets 118 can hold the vertical solar modules 104 at a distance from the vertical members 108, 110 and vertical supports 116, creating a gap 124 around the perimeter of each module 104. The gap 124 can allow for air movement through and around the vertical solar modules 104. By allowing air flow through the gaps 124, the mounting configuration helps distribute wind forces across the installation rather than creating a solid barrier, which can stress on the frame components and mounting points. The gap 124 can be configured about a perimeter of each vertical solar module 104 and can further enable effective heat dissipation during operation. This configuration can enhance the overall structural stability of the solar panel system 100 while optimizing the performance of the bifacial vertical solar modules 104.

In certain embodiments, for example as shown in FIGS. 1 and 5, the frame 102 can support three vertical solar modules 104 arranged in series between the first vertical member 108 and second vertical member 110. Two vertical supports 116 can be disposed between the first vertical member 108 and second vertical member 110, with each vertical support 116 positioned between adjacent solar modules 104. The vertical supports 116 can be connected to the adjacent vertical members 108, 110 using mounting brackets 118, with two brackets 118 securing each connection point, including one mounting bracket 118 positioned near the top horizontal support 112 and one mounting bracket 118 positioned near the cross horizontal support 114. This configuration enables secure mounting of the solar modules 104 while maintaining proper spacing and structural integrity throughout the installation.

The number and placement of mounting brackets 118 can be selected by those skilled in the art based on factors including the size and weight of the solar modules 104, expected wind loads, and structural requirements of the installation. While the embodiment depicted in the figures utilizes two mounting brackets 118 per vertical support 116 connection point, additional mounting brackets 118 can be incorporated to provide enhanced structural support for installations subject to higher mechanical loads. The spacing and positioning of the mounting brackets 118 can be optimized to maintain proper alignment of the solar modules 104 while ensuring adequate support throughout operation.

With reference to FIGS. 3-4 and 7-8, the reflector system 106 can include a reflector panel 126 that can be attached to each of the first vertical member 108 and second vertical member 110 via a mounting assembly 128. The mounting assembly 128 can secure the reflector panel 126 while maintaining proper angular disposition relative to the vertical solar modules 104. The angular disposition can improve an angle of incidence of the reflected sunlight onto the solar module 104, thereby maximizing energy capture throughout the day.

The reflector panel 126 can be fabricated from highly reflective materials such as polished stainless steel, which offers superior corrosion resistance, or polished aluminum, which provides a lightweight alternative while maintaining good reflective properties. The reflector system 106 can be configured to direct sunlight that would otherwise not strike the vertical surfaces of the vertical solar module 104. Reflector panels 126 can be disposed on either side of the frame 102 and configured to direct sunlight to each face of the vertical solar module 104. The reflector panels 126 can be attached below the solar module 104 to optimize reflection and solar energy capture by each vertical solar module 104 throughout the day. The reflector system 106 can be specifically configured to mitigate a power dip in a power curve of the vertical solar module 104 during high noon when the sun is directly above and in-line with the vertical solar module 104 and could potentially result in reduced power output. The reflector system 106 addresses this by redirecting sunlight to the vertical solar module 104 even when the sun position is substantially 180° relative to each face of the vertical solar module 104.

The mounting assembly 128 can include a first mounting arm 130 and a second mounting arm 132. The first mounting arm 130 can be configured to attach to the first vertical member 108, while the second mounting arm 132 can be configured to attach to the second vertical member 110. Each connection point between the mounting arms 130, 132 and the respective vertical members 108, 110 can include an associated mounting bracket 134. The mounting brackets 134 can secure the mounting arms 130, 132 to the vertical members 108, 110 while maintaining a predetermined angular disposition of the reflector panels 126 to optimize sunlight redirection onto the vertical solar modules 104.

The mounting arms 130, 132 can be disposed at an angle relative to the vertical members 108, 110 to optimize the positioning of the reflector panels 126. The angular disposition of the mounting arms 130, 132 enables the reflector system 106 to effectively redirect sunlight that would otherwise not strike the vertical surfaces of the solar module 104, particularly during periods when the sun is directly overhead. This configuration helps mitigate power output reduction during high noon when the sun is in-line with the vertical solar module 104. The angular positioning of the mounting arms 130, 132 can be configured to improve the angle of incidence of the reflected sunlight onto the solar module 104, thereby maximizing energy capture throughout the day. In certain embodiments, the angle of the mounting arms 130, 132 relative to the vertical members 108, 110 can be adjustable to optimize solar reflection based on installation location and seasonal variations.

The mounting arms 130, 132 can include C-shaped beams having a channel configuration. The C-shaped beams of the mounting arms 130, 132 enables secure attachment to both the frame 102 and the reflector panels 126. The channel shape of the C-shaped beams provides mounting surfaces for securing the mounting brackets 134 to the vertical members 108, 110, while also allowing the reflector panels 126 to be mounted along the length of the mounting arms 130, 132. This configuration ensures proper positioning and angular disposition of the reflector panels 126 relative to the vertical solar modules 104 to optimize sunlight redirection throughout the day. The C-shaped beams can also provide resistance to torsional forces that may result from wind loads on the reflector system 106.

The mounting bracket 134 can include a U-shaped configuration having a central panel 136 and side panels 138 extending therefrom. The mounting arms 130, 132 can include a major surface 140. The mounting bracket 134 can be attached to the upper surface of the major surface 140 adjacent an end of the mounting arm 130, 132. Specifically, the central panels 136 of the mounting brackets 134 can be disposed on the major surface 140 of the mounting arm 130, 132. The central panel 136 can include one or more apertures 142, and the major surface 140 can include one or more corresponding apertures 144. The apertures 142, 144 can be aligned to receive a fastener 146, securing the mounting bracket 134 to the mounting arm 130, 132. This configuration enables proper positioning and secure attachment of the reflector system 106 to optimize sunlight redirection onto the vertical solar modules 104.

Each side panel 138 can include one or more apertures 148. Each of the vertical members 108, 110 can include corresponding apertures 150 configured to align with the apertures 148 of the side panels 138. The aligned apertures 148, 150 can receive fasteners to secure the mounting bracket 134 to the vertical members 108, 110.

The reflector system 106 can include the mounting assembly 128 and another mounting assembly 128'. The other mounting assembly 128' can include corresponding components to those of the first mounting assembly 128, including mounting arms 130', 132' and mounting brackets 134' having the same configuration as the first mounting assembly 128. Each vertical member 108, 110 can receive a mounting bracket 134 from the first mounting assembly 128 and a mounting bracket 134' from the second mounting assembly 128'. In embodiments utilizing I-beam vertical members 108, 110 (e.g., FIGS. 5-8), the mounting brackets 134, 134' can be secured directly to opposite sides of the I-beam flanges 152, with the brackets 134, 134' abutting one another on each vertical member 108, 110.

In embodiments utilizing tubular vertical members 108, 110 (e.g., FIGS. 1-4), the mounting brackets 134, 134' can be configured to work in conjunction with one another. The side panels 138 of the mounting brackets 134, 134' can be disposed in an overlapping arrangement, such that the apertures 148, 148' of all four side panels 138, 138' from both mounting brackets 134, 134' align with the corresponding apertures 150 in the tubular vertical member. A fastener and nut assembly 154 can then pass through the aligned apertures 148, 148', 150 of both mounting brackets 134, 134' and the vertical member 108, 110, securing both mounting assemblies 128, 128' to the vertical member 108, 110 simultaneously.

The reflector system 106 can include multiple reflector portions 156. Each reflector portion 156 can include a C-shaped configuration having a top reflective surface 158, side walls 160 extending from opposing edges of the top reflective surface 158, and mounting walls 162. The mounting walls 162 can extend from the side walls 160 in a direction perpendicular to the side walls 160 and parallel to the top reflective surface 158. The top reflective surface 158 of each of the reflector portions 156 can be fabricated from highly reflective materials such as polished stainless steel, which offers superior corrosion resistance, or polished aluminum, which provides a lightweight alternative while maintaining good reflective properties. The mounting walls 162 can provide secure attachment points for connecting the reflector portions 156 to the mounting arms 130, 132, while the side walls 160 provide structural rigidity to maintain the proper angular disposition of the top reflective surface 158.

The C-shaped configuration of the reflector portions 156 provides certain advantages. First, the modular configuration enables individual reflector portions 156 to be independently replaced if damaged without requiring replacement of the entire reflector panel, enhancing system maintainability and reducing repair costs. Second, the C-shaped configuration positions the mounting walls 162 below and parallel to the top reflective surface 158, creating an essentially uninterrupted reflective surface while maintaining secure attachment to the mounting arms 130, 132. This unbroken reflective surface optimizes sunlight redirection onto the vertical solar modules 104, particularly during periods when the sun is directly overhead, helping to mitigate power output reduction during high noon.

The frame 102 can include different foundation configurations based on the type of vertical members 108, 110 used. In embodiments utilizing I-beam vertical members 108, 110, the vertical members themselves can serve as the foundation members by being driven directly into the ground. This configuration removes the need for additional foundation components while maintaining structural stability. In embodiments utilizing tubular vertical members 108, 110, the frame 102 can be secured using ground screws 164, as shown in FIG. 1. The tubular vertical members 108, 110 can telescope and/or be received by or into the ground screws 164, providing a secure foundation while enabling adjustability in height and leveling. This telescoping connection between the vertical members and ground screws ensures proper alignment and stability of the frame 102. The ground mounting system can be selected based on factors including soil conditions, local building requirements, and installation site characteristics. The telescoping feature of the tubular members into ground screws 164 allows for adaptation to varying terrain while maintaining proper orientation of the vertical solar modules 104 and reflector system 106.

The present disclosure further contemplates a method 200 of installing a solar panel system 100, for example as shown in FIG. 10. A step 202 of the method 200 can include providing a frame 102 including a first vertical member 108, a second vertical member 110, a top horizontal support 112 extending between the first vertical member 108 and second vertical member 110, and a cross horizontal support 114 extending between the first vertical member 108 and second vertical member 110.

A step 204 of the method 200 can include installing vertical supports 116 between the horizontal supports 112, 114 using mounting brackets 118 secured through central apertures 120 and mounting slots 122 to provide additional structural stability to the frame 102. A step 206 of the method 200 can include installing the vertical solar modules 104 between the vertical members 108, 110 and vertical supports 116 using mounting brackets 118 configured to create perimeter gaps 124 for air circulation and reduced wind resistance. A step 208 of the method 200 can include selecting an angular disposition, such as a predetermined angle, for the mounting arms 130, 132 relative to the vertical members 108, 110 to optimize sunlight redirection onto the vertical solar modules 104, particularly during periods when the sun is directly overhead. A step 210 of the method 200 can include securing mounting brackets 134, 134' to the vertical members 108, 110. A step 212 of the method 200 can include securing mounting arms 130, 132 to the mounting brackets 134, 134' at the selected angle. A step 214 of the method 200 can include mounting reflector portions 156 to the mounting arms 130, 132, with mounting walls 162 providing attachment points below top reflective surfaces 158.

EXAMPLES

Example embodiments are provided so that this disclosure will be thorough and will fully convey the scope to those who are skilled in the art. The solar panel system 100 can be implemented in various configurations and applications to maximize energy capture while addressing specific installation requirements. The following examples demonstrate implementations of the solar panel system 100 in agricultural, urban, and transportation settings, illustrating the versatility of the frame 102, vertical solar modules 104, and reflector system 106 across different environmental conditions and functional requirements. These examples are provided for illustration purposes, and it will be apparent to those skilled in the art that specific details need not be employed, that example embodiments may be adapted to many different forms and should be construed to limit the scope of the disclosure.

Example 1: Agricultural Installation

A solar panel system 100 can be installed on a farm located in a semi-arid region to maximize land use efficiency. The installation can utilize tubular vertical members 108, 110 with ground screw foundations to accommodate variable terrain typical of agricultural settings. The frame 102 can support three vertical bifacial solar modules 104 with two vertical supports 116 positioned between adjacent modules, creating perimeter gaps 124 for air circulation.

The reflector system 106 can include polished aluminum reflector portions 156 mounted to the angled mounting arms 130, 132. The C-shaped configuration of the reflector portions 156, with top reflective surfaces 158, side walls 160, and mounting walls 162, can enable easy maintenance and replacement of individual sections when damaged by agricultural equipment. The mounting brackets 134, 134' can be configured in the overlapping arrangement, with central panels 136 and side panels 138 securing the mounting arms 130, 132 to the tubular vertical members 108, 110 through aligned apertures 142, 144, 148, 150.

The installation can demonstrate significant benefits for agricultural applications. The vertical orientation of the solar modules 104, supported by the top horizontal support 112 and cross horizontal support 114, can allow for air circulation through gaps 124, reducing wind resistance while enabling farm equipment to operate in close proximity. The first mounting assembly 128 and second mounting assembly 128' can secure the reflector panels 126 at optimal angles to enhance energy capture throughout the day.

Example 2: Urban Building Integration

A solar panel system 100 can be installed on the exterior wall of an urban residential building using I-beam vertical members 108, 110 driven directly into the ground as foundation members. The frame 102 can support multiple vertical solar modules 104 arranged in series with vertical supports 116 providing structural stability through mounting brackets 118 with central apertures 120 and mounting slots 122.

The reflector system 106 can utilize polished stainless steel reflector portions 156 with top reflective surfaces 158, side walls 160, and mounting walls 162 for superior corrosion resistance in the urban environment. The mounting brackets 134, 134' with central panels 136 and side panels 138 can be secured directly to the I-beam flanges through apertures 148, with brackets from adjacent mounting assemblies 128, 128' abutting one another on the major surfaces 140 of mounting arms 130, 132.

The installation can demonstrate effective integration with the building structure while maximizing energy capture through the strategic positioning of reflector panels 126 secured by the first mounting assembly 128 and second mounting assembly 128'. The top horizontal support 112 and cross horizontal support 114 can maintain proper spacing and alignment of the vertical solar modules 104.

Example 3: Highway Sound Barrier Application

A solar panel system 100 can be integrated into highway noise barriers using tubular vertical members 108, 110 with ground screw foundations to accommodate variations in terrain along the highway. The frame 102 can support multiple vertical solar modules 104 with vertical supports 116 positioned between mounting brackets 118, utilizing central apertures 120 and mounting slots 122 to maintain structural integrity against increased wind loads.

The reflector system 106 can incorporate polished stainless steel reflector portions 156 with top reflective surfaces 158, side walls 160, and mounting walls 162, featuring enhanced durability coatings. The mounting brackets 134, 134' can be configured in the overlapping arrangement, with central panels 136 and side panels 138 securing the mounting arms 130, 132 through aligned apertures 142, 144, 148, 150 fastened by fasteners 146.

The installation can serve dual purposes as both a noise barrier and power generation system. The vertical orientation with perimeter gaps 124 between the top horizontal support 112 and cross horizontal support 114 can help distribute wind forces from passing vehicles. The first mounting assembly 128 and second mounting assembly 128' can secure the reflector panels 126 at optimal angles to enhance energy capture for powering highway lighting and signage.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A solar panel system comprising:

a frame including:

a first vertical member;

a second vertical member;

a top horizontal support extending between the first vertical member and second vertical member;

a cross horizontal support extending between the first vertical member and second vertical member;

a vertical solar module disposed between the first vertical member and second vertical member;

a reflector system including:

a mounting assembly including a first mounting arm and a second mounting arm, each of the first mounting arm and the second mounting arm disposed at an angle relative to the vertical members; and a reflector panel disposed on each of the first mounting arm and the second mounting arm.

2. The solar panel system of claim 1, wherein the vertical solar module includes a bifacial solar panel having solar cells on both sides.

3. The solar panel system of claim 1, wherein the vertical solar module is comprised by a plurality vertical solar modules disposed between the first vertical member and second vertical member.

4. The solar panel system of claim 3, further comprising a vertical support extending between the top horizontal support and the cross horizontal support.

5. The solar panel system of claim 4, wherein the vertical support is disposed between adjacent vertical solar modules such that the first vertical member, a first vertical solar module, the vertical support, a second vertical solar module, and the second vertical member are arranged in series to form a linear configuration between the first vertical member and second vertical member.

6. The solar panel system of claim 1, wherein the reflector panel includes a plurality of reflector portions mounted to each of the first mounting arm and the second mounting arm.

7. The solar panel system of claim 6, wherein each reflector portion includes:

a top reflective surface;

side walls extending from opposing edges of the top reflective surface; and mounting walls extending from the side walls perpendicular thereto and parallel to the top reflective surface.

8. The solar panel system of claim 1, further comprising a plurality of mounting brackets securing the vertical solar module to the frame.

9. The solar panel system of claim 8, wherein the mounting brackets hold the vertical solar module away from the frame thereby maintaining a perimeter gap around the vertical solar module.

10. The solar panel system of claim 1, wherein the first vertical member and the second vertical member are tubular members.

11. The solar panel system of claim 10, wherein the first vertical member and the second vertical member adjustably telescope into ground screws.

12. The solar panel system of claim 10, wherein the mounting assembly includes a plurality of mounting brackets, each mounting bracket having a central panel and side panels extending therefrom, apertures in the central panel that align with corresponding apertures in a major surface of the first mounting arm and the second mounting arm, and apertures in the side panels that align with corresponding apertures in the vertical members.

13. The solar panel system of claim 1, wherein the first vertical member and second vertical member comprise I-beams configured to be driven into the ground as foundation members.

14. The solar panel system of claim 13, wherein the mounting assembly includes mounting brackets having side panels configured to abut one another on opposite flanges of the I-beams to secure the first mounting arm and the second mounting arm to the I-beams.

15. The solar panel system of claim 1, wherein the reflector system further includes another mounting assembly including:

another first mounting arm and another second mounting arm, each of the another first mounting arm and the another second mounting arm disposed at an angle relative to the vertical members; and another reflector panel disposed on each of the another first mounting arm and the another second mounting arm.

16. The solar panel system of claim 15, wherein the mounting assembly and the reflector panel are disposed on a first side of the vertical solar module, the another mounting assembly and the another reflector panel are disposed on a second side of the vertical solar module, the reflector panel and the another reflector panel configured to direct sunlight onto opposite faces of the vertical solar module.

17. The solar panel system of claim 1, wherein the first mounting arm and second mounting arm include C-shaped beams.

18. The solar panel system of claim 1, wherein the reflector panel has a reflective surface including polished stainless steel or polished aluminum.

19. A solar panel system, comprising:

a frame including a first vertical member, a second vertical member, a top horizontal support extending between the first vertical member and second vertical member, a cross horizontal support extending between the first vertical member and second vertical member, and a plurality of vertical supports extending between the top horizontal support and cross horizontal support;

a plurality of vertical solar modules disposed between the first vertical member and second vertical member, each vertical solar module including a bifacial solar panel having solar cells on both sides;

a plurality of mounting brackets securing the vertical solar modules to the frame while maintaining perimeter gaps around the vertical solar modules;

a reflector system including first and second mounting assemblies, each mounting assembly including:

first and second mounting arms disposed at angles relative to the vertical members;

mounting brackets having central panels and side panels securing the mounting arms to the vertical members;

a plurality of reflector portions mounted to the mounting arms, each reflector portion having:

a top reflective surface;

side walls extending from opposing edges of the top reflective surface; and mounting walls extending from the side walls perpendicular thereto and parallel to the top reflective surface;

wherein the first mounting assembly and associated reflector portions are disposed on a first side of the vertical solar modules and the second mounting assembly and associated reflector portions are disposed on a second side of the vertical solar modules to direct sunlight onto opposite faces of the vertical solar modules.

20. A method of installing a solar panel system comprising:

providing a frame including a first vertical member, a second vertical member, a top horizontal support extending between the first vertical member and second vertical member, and a cross horizontal support extending between the first vertical member and second vertical member;

installing a vertical solar module between the vertical members using mounting brackets;

selecting an angular disposition for mounting arms relative to the vertical members to optimize sunlight redirection onto the vertical solar modules;

securing mounting brackets to the vertical members;

securing the mounting arms to the mounting brackets at the selected angle; and mounting reflector panels to the mounting arms.

* * * * *